C. N. MUNDELL.
POWER TRANSMITTING MECHANISM.
APPLICATION FILED JULY 7, 1917.
1,271,203.
Patented July 2, 1918.
4 SHEETS—SHEET 1.
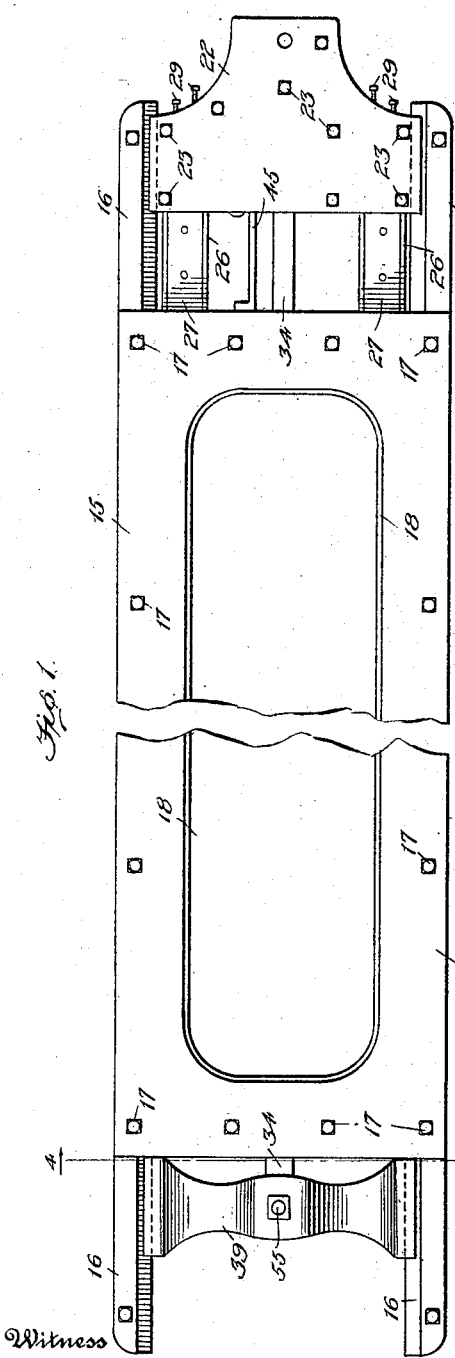
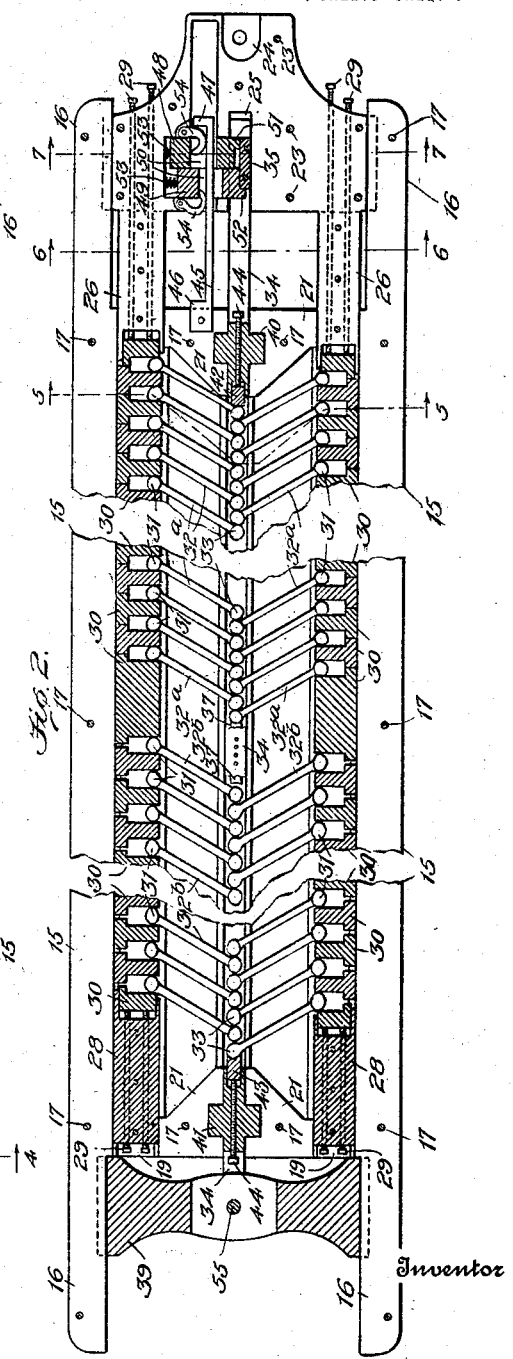
Witness
Edwin L. Bradford
Inventor
Charles Nathaniel Mundell

C. N. MUNDELL.
POWER TRANSMITTING MECHANISM.
APPLICATION FILED JULY 7, 1917.

1,271,203.

Patented July 2, 1918.
4 SHEETS—SHEET 2.

Witness
Edwar L Bradford

Inventor
Charles Nathaniel Mundell

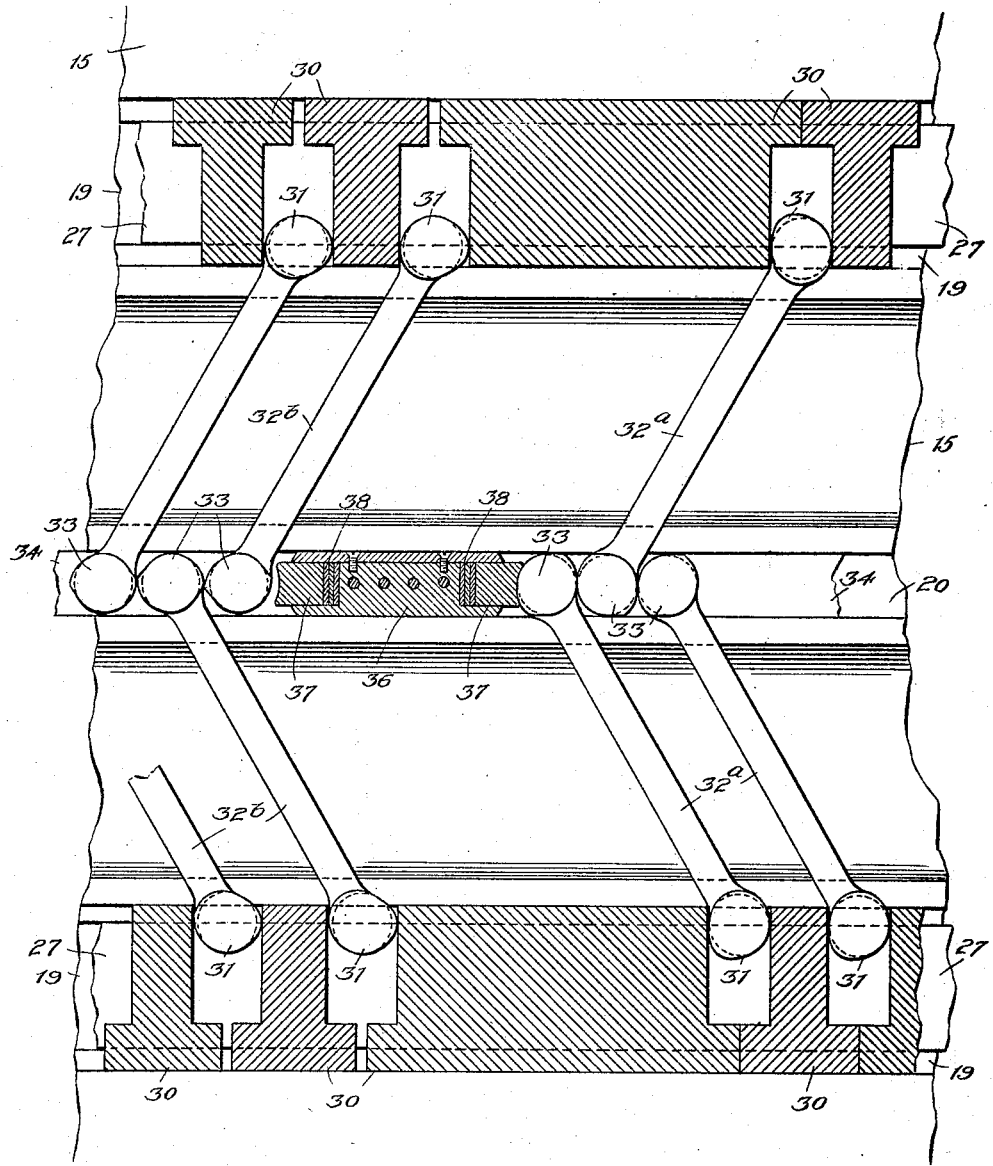

C. N. MUNDELL.
POWER TRANSMITTING MECHANISM.
APPLICATION FILED JULY 7, 1917.
1,271,203.
Patented July 2, 1918.
4 SHEETS—SHEET 4.
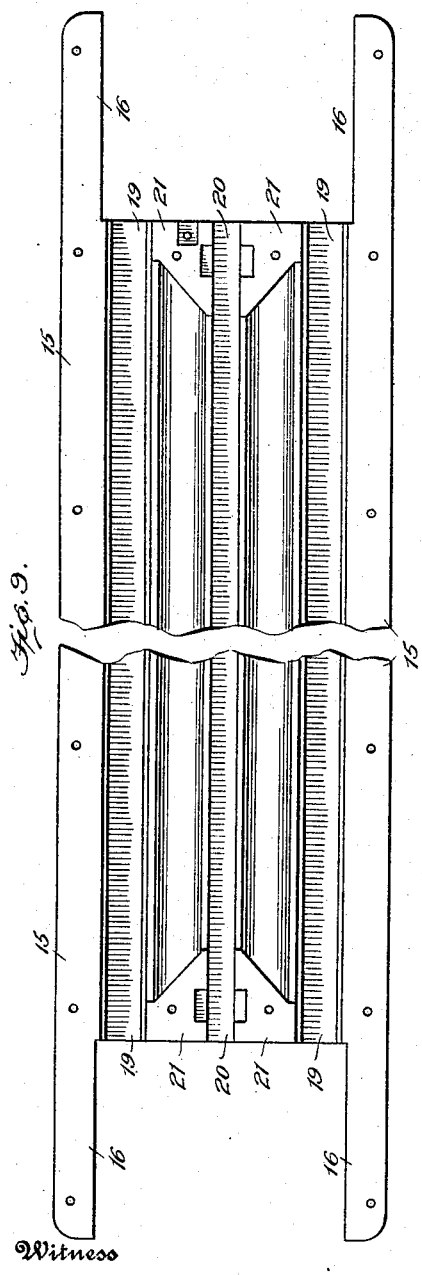
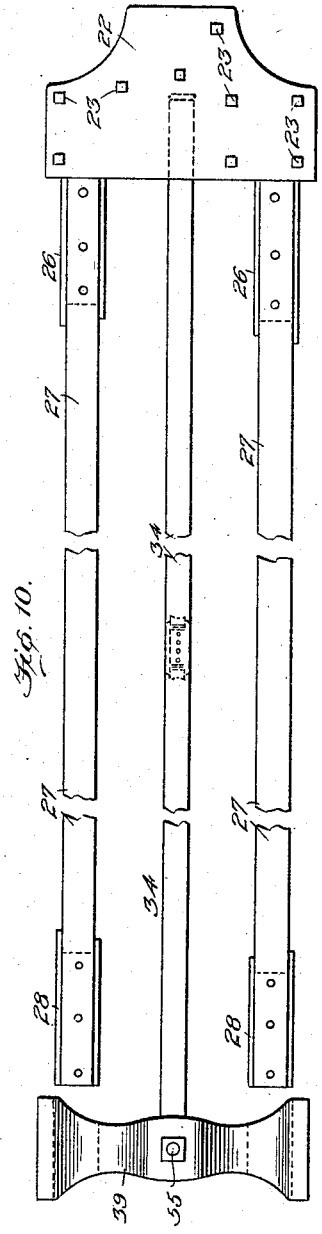
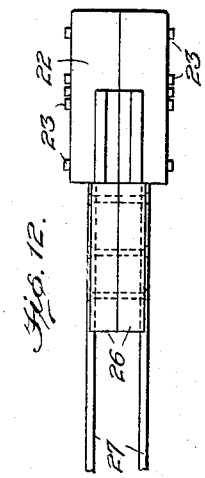
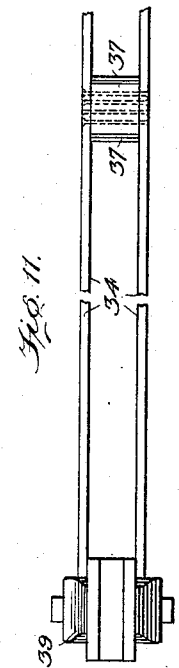
Witness
Edwin L. Bradford
Inventor
Charles Nathaniel Mundell

UNITED STATES PATENT OFFICE.

CHARLES NATHANIEL MUNDELL, OF LOS ANGELES, CALIFORNIA.

POWER-TRANSMITTING MECHANISM.

1,271,203.

Specification of Letters Patent.

Patented July 2, 1918.

Application filed July 7, 1917. Serial No. 179,213.

*To all whom it may concern:*

Be it known that I, CHARLES NATHANIEL MUNDELL, a citizen of the United States, residing at Los Angeles, in the county of Los Angeles and State of California, have invented certain new and useful Improvements in Power-Transmitting Mechanism; and I do hereby declare the following to be a full, clear, and exact description of the invention, such as will enable others skilled in the art to which it appertains to make and use the same.

My invention relates to machine elements, but more particularly to power transmission, and to novel power transmitting mechanism designed, arranged and adapted to be interposed between a prime mover and work to be accomplished by it. The invention therefore relates to a mechanical movement which may be employed for a large variety of useful purposes, including, for example, that of converting rotary into reciprocating motion, and vice versa.

One object of the present invention is the production of an organized coöperating arrangement and combination of parts capable of accomplishing the desired results with the least possible expenditure of power, and with accuracy and precision.

A further object is the production of mechanism of the character indicated including in combination a suitable supporting frame, reciprocating cross-heads, both driving and driven, at opposite ends of said frame, a double series of forcing blocks slidably mounted in opposite sides of said supporting frame, and a multiplicity of forcing levers adjustably supported in herringbone formation between the cross-heads aforesaid, the same being carried at their outer ends by said forcing blocks, and provided upon their inner contacting ends with driving eccentrics, whereby movement of the driving crosshead is transmitted to the driven crosshead, through the purchase afforded by said levers and the cumulative action of their eccentrics or cam-faced contacting inner surfaces.

With the foregoing and other objects and advantages in view the invention will be hereinafter particularly described and pointed out in the claims following.

In the accompanying drawings which form part of this application for Letters Patent and whereon corresponding numerals refer to like parts in the several views:

Figure 1 is a side elevation of my invention assembled and ready for use the same being broken out at a median position for economy of space.

Fig. 2 is a longitudinal central section taken vertically through the mechanism disclosing to view all working movable parts.

Fig. 8 is a relatively enlarged fragmentary sectional view taken out of the center of Fig. 2.

Fig. 9 is an inside view in elevation of one of the two corresponding frame sections.

Fig. 10 is a view in side elevation showing the driving and driven crossheads and relatively movable slide bars connected to their respective heads.

Fig. 11 is a fragmentary view showing in plan the driven crosshead and a pair of oppositely disposed centrally positioned and parallel slide bars.

Fig. 12 is a view similar to Fig. 11, showing the driving head in plan, and the uppermost of two pair of parallel slide bars, and, Fig. 13 is a detail view in side elevation of one modified form of one forcing or operating lever, broken away for economy of space and reinforced on its ends by eccentric straps of case-hardened steel.

Figure 3:
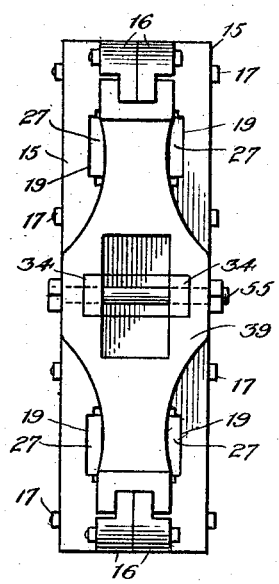
Fig. 3 is an end view of the structure showing the driven crosshead in end elevation.
Figure 4:
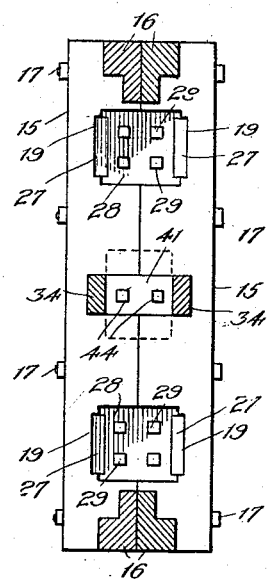
Fig. 4 is a view corresponding with Fig. 3 the crosshead being removed, or in other words a transverse section on the line 4—4, Fig. 1.

Reference being had to the drawings and numerals thereon, 15, 15 indicate two corresponding sections or halves of a main supporting frame preferably of cast iron having top and bottom extension rails 16, 16 and securely bolted together as at 17. On their outer surfaces these sections 15 may be paneled as at 18, their inner opposing faces being configured by upper and lower slideways or grooves 19, 19, extending from end to end of the structure, and a corresponding central slideway or groove 20 also opening through both ends of the structure. At its ends and between the grooves aforesaid the castings 15 are provided with bearing surfaces 21 as best shown by Fig. 9 which abut and are also bolted together in assembling.

Upon one pair of extension rails 16 at the right of Fig. 9 is slidably mounted a driving crosshead 22 made in two corresponding sections bolted together as at 23 having an end pocket 24 to receive one end of a piston or pitman rod (not shown) and cored out as at 25 to receive a momentum safety clutch of novel construction which will be hereinafter described.

Projecting forwardly from the head 22 at top and bottom are corresponding arms 26, 26, to the grooved sides of which are securely bolted side bars 27, 27 extending throughout substantially the length of the structure and held apart at their opposite ends by grooved spacing blocks 28, likewise bolted in position, as best shown by Fig. 10. Extending longitudinally through all arms 26 and blocks 28 are four, more or less, adjusting screws 29, each set bearing upon the first of a series of forcing blocks 30 positioned between each pair of side bars 27, while the said bars 27 and their interposed independently movable blocks 30 are slidably received in the upper and lower grooved slideways 19 when the structure is assembled.

Between all adjacent blocks 30 there is positioned the outermost ends 31 of two series of forcing levers 32$^a$ and 32$^b$ alternately placed in parallel arrangement with their opposite or innermost ends 33 centrally positioned and in contact as shown by Fig. 2. These forcing or operating levers 32$^a$ and 32$^b$ have elongated ends both of which are provided with eccentric or cam faces for purposes which will later appear.

Positioned slidably in the central grooves 20 of castings 15 is a pair of parallel slide bars 34 extending throughout the length of the structure and flanking on both sides the innermost ends 33 of all eccentric levers aforesaid. At their inner ends these bars 34 are connected and spaced apart by a block 35, at an intermediate point they are similarly spaced apart by a two-part H-shaped space-block 36 having end shoes 37, 37 and interposed plates 38 the removal or replacement of which latter renders said shoes adjustable in a measure, while at their outer ends the said plates 34 are bolted to opposite sides of a driven crosshead 39 slidably mounted upon the top and bottom extension rails 16 shown at the left of Figs. 1, 2 and 9.

Within the sides 15 of the main supporting frame there are fixed guiding blocks 40 and 41 the opposing faces of which are slotted to receive adjusting blocks 42 and 43 contacting normally with the first of the inner eccentric ends of each series of levers 32$^a$ and 32$^b$, and rendered adjustable by agency of screws 44 extending longitudinally through said guiding blocks 40 and 41. These guiding blocks 40 and 41 therefore, through which the parallel bars 34 reciprocate, are fixed with relation to frame 15, their respective shoes 42 and 43 being also fixed except for the slight adjustment afforded by screws 44 for the purpose of taking up wear.

Projecting rearwardly from the bearing faces 21 of the main frame members 15 is a rigid horizontally arranged latch member 45 having upturned ends 46 and 47, and projecting into the chamber 25 cored out of the inner abutting faces of the driving crosshead sections 22. In this chamber 25 also there are two vertically reciprocating latch blocks 48 and 49 both perforated horizontally as at 50 to permit passage of the latch member 45 aforesaid, each provided with a downwardly projecting tooth 51 and 52 respectively, and each spring-pressed above as at 53 to normally force them downward, while depending from the casting 22 into the perforations 50 of each latch block 48 and 49 are actuating hooks 54, as shown by Fig. 2. These elements 45, 46, 47, 48, 49, 50, 51, 52, 53, 54 and the block 35 aforesaid, or their equivalents, constituting a novel momentum safety clutch for use under certain conditions as will appear in a brief statement of operation to follow.

Figure 5:
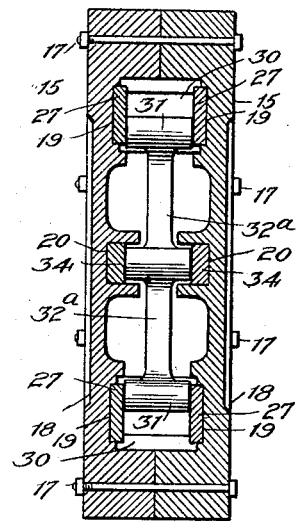
Fig. 5 is a transverse vertical section taken on the zig-zag line 5—5, Fig. 2, looking in the direction of arrows.
Figure 6:
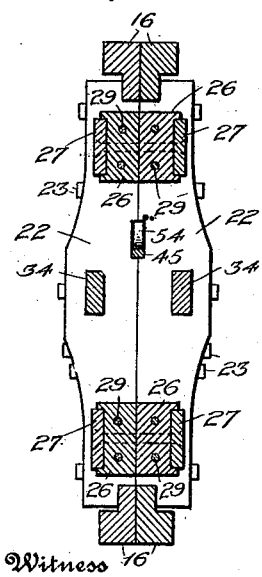
Fig. 6 is also a transverse vertical section taken on the line 6—6, Fig. 2.
Figure 7:
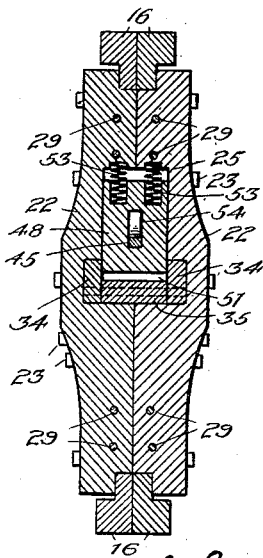
Fig. 7 is a view similar to Fig. 6, but taken on the line 7—7, Fig. 2.
Figure 13:
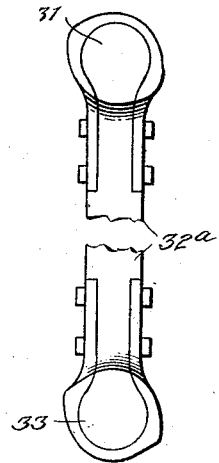

The forcing or actuating levers 32$^a$ and 32$^b$ arranged in upper and lower series are preferably of the general form indicated by Fig. 5 of the drawings, they may each be of unitary structure and of any suitable material, the T-ends 31 and 33 preferably being case-hardened to prevent undue wear; or, they may if desired be made substantially as indicated by Fig. 13, being of comparatively soft or light material reinforced on their working cam surfaces by straps suitably tempered. In any event, however, the greater diameter of the cams or forcing eccentrics of those levers marked 32$^a$ is in a general vertical direction when parts are in the position indicated by Figs. 2 and 8; and the greater diameter of the eccentrics of the levers marked 32$^b$ is in a general horizontal direction when parts are in the position shown by said Figs. 2 and 8.

Obviously, the present invention may be interposed between prime movers of any description and the work to be performed as a means of transmitting power, but for present purposes let it be supposed by way of exemplification that the invention is located between the reciprocating piston rod of a steam or gas engine (not shown) pivotally connected as at 24, and a pitman rod (not shown) connected to the driven crosshead 39 by means of a through pin such as 55, the said pitman rod in turn being connected eccentrically to an ordinary fly-wheel, whereby reciprocating motion may be converted into rotary.

Power now applied to the driving crosshead 22 operates through its extension arms 26 to advance both lines of forcing blocks 30 between side bars 27 in upper and lower grooves 19 of the supporting frame. As a result the forcing levers 32$^a$ and 32$^b$ are collectively turned over on their eccentrics 33 resting between parallel side bars 34 slidably mounted in the central groove or slideway 20, thus forcing the eccentrics or cam ends 33 of all levers 32$^a$ into contact and materially increasing the diameters thereof collectively considered, and operating through the entire series upon the central space-block 36 fixed between the bars 34 aforesaid, and thence by way of said bars upon the driven crosshead 39 to which they are connected for the purpose of projecting it the full length of its stroke.

During this operation all spaces between the blocks 30 at the driving end of the mechanism are closed as shown by Figs. 2 and 8, while all such spaces at the driven end are proportionally spread by a reverse action of their respective cam or eccentric surfaces thus providing clearance in both directions for movement of the forcing levers.

During the reverse or return stroke of the mechanism conditions are reversed, the blocks 30 are pulled back by cross-head 22 acting by agency of end space blocks 28 carried between side bars 27 to return all blocks 30 and restore all levers 32$^a$ and 32$^b$ again to the position indicated by Figs. 2 and 8, in this instance, however, the levers 32$^b$ are the active driving elements while those marked 32$^a$ are mere spacing elements. This reversely reciprocating motion may be continued indefinitely, but in the event that steam or other motive power is closed off from the prime mover for any reason, then in that case if the driven crosshead 39 should be carried over by momentum of a fly-wheel usually employed where power is transmitted, then provision must be made for avoiding injury by jamming of the eccentrics 33 as the result of further movement of said driven head 39 the side bars 34 and space block 36. In other words, clearance must be obtained by a reversal of position of the forcing eccentrics 33, and this can only be accomplished by a partial throw of the levers 32$^a$ and 32$^b$ by a reverse movement of blocks 30 ordinarily under direct control of the driving head 22 when same is being power driven. In the absence of power, however, as when steam is shut off from the prime mover, the head 22 is sufficiently operated to avoid injury to the mechanism by the momentum of the customary fly-wheel (not shown) upon the driven element.

As this fly-wheel goes over, its force is transmitted to the driving head 22 by agency of its parallel slide bars 34, their connecting latch block 35 at the distant end of said bars engaging tooth 51 of the momentum safety clutch hereinbefore described to force head 22 backward thereby reversing the action of all depending parts until such time as hook 54 engages the upturned end 47 of latch member 45 causing it to lift block 48 and its tooth 51 out of engagement with said block 35.

The head 22 and attending parts are now ready for the reverse or forward stroke, and if the fly-wheel momentum is still sufficient it acts through the same bars 34, block 35, tooth 52 and latch block 49 carried by the head 22 to return the latter until the hook 54 engages the opposite upturned end 46 of latch member 45 to similarly lift the latch block 49 constituting part of the momentum safety clutch mechanism. Obviously, the invention is operative without said clutch, but as an element of safety it is desirable.

The present illustrations disclose my improvements in one simplified form of construction, but obviously all moving parts may be submerged in oil if desired, or a complete oiling system, either gravity or pump-actuated, may be added as a means of reducing friction of moving parts, and likewise ball bearings may readily be added if desired or required. It might also be noted that the mechanism is quite operative if but one set of levers 32$^a$ or 32$^b$ are employed, but I prefer the double upper and lower series as a most effective way of balancing the action and avoiding undue friction.

The foregoing being a description of my invention in its best form of construction at present known to me, it should at the same time be understood that I by no means consider my invention restricted to the particular form, arrangement or combination of parts shown and described. On the contrary, these may be varied greatly without departing from the spirit of my invention, which, having been thus described, what I now claim and desire to secure by Letters Patent is:

1. In a power transmitting mechanism the combination with a supporting frame, of driving and driven crossheads reciprocally mounted in said frame, a series of eccentrics interposed betwen said heads, and means for rotating said eccentrics in reverse directions to transmit power from one of said heads to the other.

2. In a power transmitting mechanism the combination with a supporting frame, of driving and driven crossheads reciprocally mounted in said frame, a series of eccentrics interposed between said heads, a forcing lever connected with each of said eccentrics, and means whereby said leaves may be collectively actuated in both directions by agency of the driving crosshead aforesaid to transmit power from the latter to said driven crosshead.

3. In a power transmitting mechanism the combination with a supporting frame, of driving and driven crossheads reciprocally mounted in said frame, a series of eccentrics interposed between said heads in contact and alinement, forcing levers extending alternately in opposite directions from said eccentrics, and means whereby said levers may be collectively actuated in both directions by agency of the driving crosshead aforesaid to transmit power from the latter to said driven crosshead.

4. In a power transmitting mechanism the combination with a supporting frame, of driving and driven crossheads reciprocally mounted in said frame, a series of eccentrics interposed between said heads in contact and alinement, a corresponding series of forcing levers projecting oppositely and alternately from said eccentrics, a double series of slidable blocks engaging the outer ends of said levers, and means whereby said blocks may be actuated in both directions by agency of the driving crosshead aforesaid to transmit power from the latter to said driven crosshead.

5. In a power transmitting mechanism the combination with a supporting frame of a series of levers mounted in said frame having eccentric inner ends, a driving crosshead reciprocally mounted in said frame adapted to actuate the outer ends of said levers in both directions, a driven crosshead and means for reciprocating the latter as movement of the levers aforesaid crowds their eccentrics together.

6. In a power transmitting mechanism the combination with a supporting frame, of driving and driven crossheads reciprocally mounted in said frame, a series of forcing levers interposed between said heads having eccentric inner ends, means under control of the driving head whereby said eccentrics are partially rotated in reverse directions, and means whereby the driven head is actuated in both directions by agency of said eccentrics.

7. In a power transmitting mechanism the combination with a supporting frame, of driving and driven crossheads reciprocally mounted in opposite ends of said frame, a series of forcing levers interposed between said heads having eccentric inner ends in contact and alinement, means whereby said eccentrics are turned over by reciprocation of the driving head, and means whereby the driven head is actuated in both directions by agency of said eccentrics when crowded together.

8. In a power transmitting mechanism the combination with a supporting frame, of driving and driven crossheads reciprocally mounted in opposite ends of said frame, a series of forcing levers interposed between said heads having eccentric inner ends in contact and alinement, means whereby said eccentrics are turned over by reciprocation of the driving head, means whereby the driven head is reciprocated in both directions by agency of said eccentrics when crowded together, and a momentum safety clutch adapted to reciprocate the driving head by momentum of the driven head when power is shut off, substantially as described.

In testimony whereof I affix my signature this 6th day of July, 1917.

CHARLES NATHANIEL MUNDELL.